July 25, 1961 R. H. GARDNER 2,993,574
ANTI-INERTIA BRAKE FOR COUNTERSHAFT POWER TRANSMISSION
Filed May 11, 1959 3 Sheets-Sheet 1

ROBERT H. GARDNER
*INVENTOR.*
BY John R. Faulkner
Donald J. Harrington

ATTORNEYS

July 25, 1961  R. H. GARDNER  2,993,574
ANTI-INERTIA BRAKE FOR COUNTERSHAFT POWER TRANSMISSION
Filed May 11, 1959  3 Sheets-Sheet 2

ROBERT H. GARDNER
*INVENTOR.*

BY John R. Faulkner
Donald J. Harrington

ATTORNEYS

July 25, 1961 R. H. GARDNER 2,993,574
ANTI-INERTIA BRAKE FOR COUNTERSHAFT POWER TRANSMISSION
Filed May 11, 1959 3 Sheets-Sheet 3
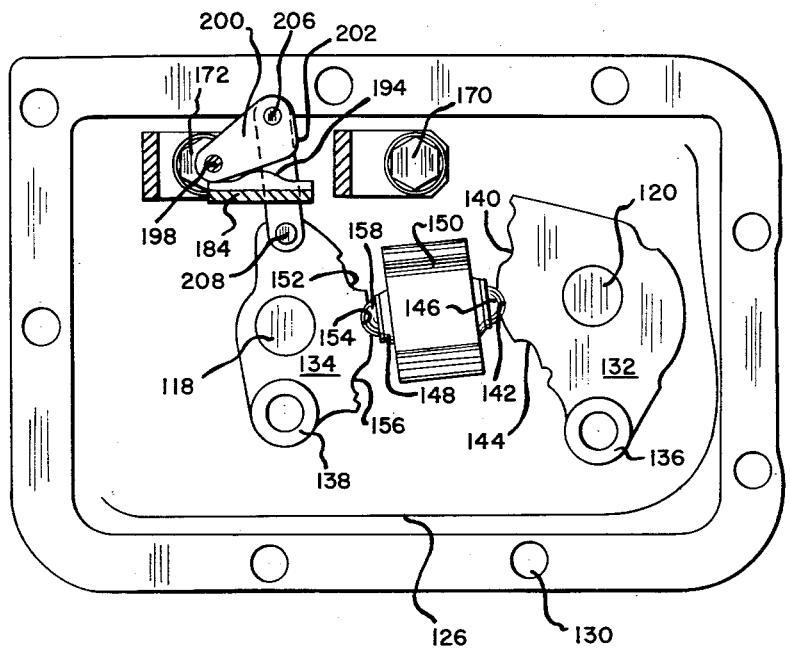
FIG. 5
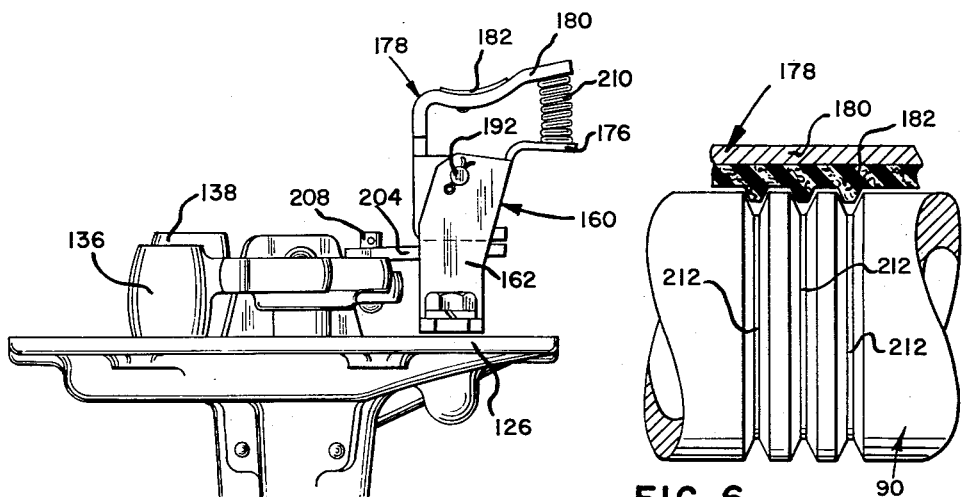
FIG. 4  FIG. 6
ROBERT H. GARDNER
INVENTOR.
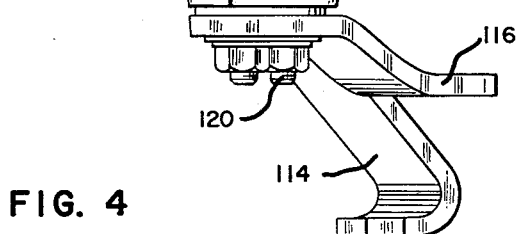
ATTORNEYS

United States Patent Office 2,993,574
Patented July 25, 1961

2,993,574
ANTI-INERTIA BRAKE FOR COUNTERSHAFT POWER TRANSMISSION
Robert H. Gardner, Mount Clemens, Mich., assignor to Ford Motor Company, Dearborn, Mich., a corporation of Delaware
Filed May 11, 1959, Ser. No. 812,266
14 Claims. (Cl. 192—4)

My invention relates generally to power transmission mechanisms, and more particularly to a geared, multiple speed power delivery gear train capable of being used with a wheeled automotive vehicle.

I contemplate that the teachings of my instant invention may be applied to a manually controlled, multiple speed, gear transmission mechanism which includes a cluster gear assembly disposed about an axis displaced from the principal axis of the power delivery gear train. Such transmissions are commonly used in wheeled automotive vehicles and they usually include a low and reverse sliding gear carried by the transmission main shaft and adapted for sliding movement into a reverse drive operating position or a low speed forward drive operating position. Separate portions of the cluster gear assembly form a part of the low speed gear train and the reverse gear train. Another gear is drivably connected to the transmission power input shaft and it is disposed in continuous meshing engagement with another element of the cluster gear assembly.

A third gear, commonly referred to as the intermediate speed gear, is journaled on the main shaft and it drivably and continuously engages the cluster gear assembly. A synchronizer clutch assembly is provided for alternately establishing a driving connection between the main shaft and the intermediate gear and between the main shaft and the power input gear, and this synchronizer clutch assembly is under the control of the vehicle operator to effect a shift between intermediate speed operation and high speed operation. In a similar fashion, the low and reverse sliding gear is under the control of the vehicle operator to condition the transmission for low forward speed operation or reverse drive operation.

A main clutch is usually disposed between the vehicle engine crankshaft and the transmission power input shaft and this clutch may be engaged and disengaged by means of a driver operated clutch pedal. The driving connection between the engine and the traction wheels may thus be interrupted while the vehicle is braked and during a manual shift from one speed ratio to another.

During operation in the high speed range, the synchronizer clutch assembly produces a direct connection between the transmission power input shaft and the transmission tailshaft, the latter being an extension of the aforementioned main shaft. The power input gear is in continuous engagement with the cluster gear assembly, as above mentioned, and the cluster gear assembly rotates at a speed which is directly related in magnitude to the vehicle engine speed.

When the transmission is shifted into a neutral, non-driving condition, the cluster gear assembly will be rotated when the main clutch is engaged. However, the main shaft will be disengaged from the cluster gear assembly since the intermediate gear is capable of freely rotating about the main shaft when the intermediate speed synchronizer clutch mechanism is disengaged and assumes a neutral condition. The transmission may then be shifted into low gear operation by disengaging the transmission main clutch and by sliding the low and reverse gear into engagement with the low speed gear portion of the cluster gear assembly. Similarly, the transmission may be conditioned for reverse drive operation by shifting the low and reverse gear in the opposite direction into engagement with a reverse drive pinion which in turn is drivably connected to a reverse gear portion of the cluster gear assembly. However, in order to accomplish such a shift into either low or reverse drive, the cluster gear assembly must either assume a stationary condition or it must be decelerated until it rotates at a very slow speed. The operator is thus required to delay shifting the low and reverse gear into the low speed drive position or into the reverse drive position following disengagement of the transmission main clutch until the cluster gear assembly has decelerated to the required degree.

The spin of the cluster gear assembly following disengagement of the main clutch is due to its inherent inertia and is also due to the inertia of the rotary main clutch disc. It is not unusual for the cluster gear assembly and the associated rotary clutch components to spin for a time interval of four seconds or more following disengagement of the main clutch. Further, if the pilot bearing for the transmission power input shaft in the clutch flywheel assembly has substantial friction, or if the clutch disc of the main clutch drags against the clutch flywheel or the main clutch pressure plate, the total spin time of the cluster gear assembly following disengagement of the main clutch with the transmission conditioned for neutral will be considerably increased—for example, ten seconds or more.

This delay in the shifting operation is undesirable and rotation of the cluster gear assembly causes undue clashing of the gear teeth when the transmission is shifted into low.

The improvement of my instant invention is capable of eliminating difficulties of the type above described and is adapted to reduce the spin time of the cluster gear assembly following disengagement of the main clutch.

The provision of an improved transmission assembly of the type above set forth being a principal object of my invention, it is a further object of my invention to provide a multiple speed gear transmission having components capable of being shifted into and out of driving engagement with a maximum degree of smoothness.

It is a further object of my invention to provide a transmission of the type set forth above wherein means are provided for retarding rotary motion of the cooperating gear portions of the transmission mechanism prior to engagement of the same.

It is a further object of my invention to provide a transmission having relatively engageable gear portions wherein means are provided for braking the rotary motion of one gear portion relative to another during a shift of one of the gear portions into engagement with the other during a shift sequence thereby reducing the total shift time interval.

It is a further object of my invention to provide a multiple speed power transmission mechanism having rotary gear components wherein means are provided for braking the rotary motion of one gear component relative to a cooperating gear component due to the inherent inertia of the rotating mass.

It is a further object of my invention to provide an improved transmission of the type above set forth wherein the means for accomplishing a braking of the relative motion of the gear components may be incorporated in a variety of transmission mechanisms of known construction and wherein a minimum amount of modification is required.

It is a further object of my invention to provide an inertia braking means of the type above set forth for use with transmissions of known construction wherein the existing transmission components may be conditioned for use in combination with my improved brake means.

Other objects and advantages of my improved invention will become apparent from the following description.

In carrying forth the foregoing objects the above described inertia braking feature is accomplished by providing a friction brake for the cluster gear assembly of a multiple speed gear transmission of the countershaft type, and I have also provided a brake operating mechanism which is mechanically connected to the operator controlled gearshift linkage. The brake operating mechanism is adapted to energize the friction brake for the cluster gear assembly when the transmission is shifted by the operator into a neutral position and the braking effect thus obtained will cause the cluster gear assembly to decelerate rapidly thereby reducing the spin time of the cluster gear assembly to permit a smooth and timely engagement of the low and reverse gear.

According to a preferred embodiment of my invention, the friction brake is normally spring biased in a brake applied direction, and the brake operating mechanism is adapted to relieve the spring pressure on the friction brake when the transmission is conditioned for either low or reverse drive. The brake operating mechanism includes a cam element which releases the friction brake when it is rotated, and rotation is imparted to the cam element by means of linkage elements connected to the synchronizer clutch mechanism. When the synchronizer clutch mechanism is shifted to a neutral position, the cam element allows the spring to engage the brake.

For the purpose of more particularly describing the improvement of my instant invention, reference will be made to the accompanying drawings, wherein:

FIGURE 4 is an end elevation view of the subassembly of FIGURE 2;

FIGURE 5 is a side elevation view of the subassembly of FIGURE 2; and

FIGURE 6 is a view partly in section showing the mode of cooperation between the friction brake and the cooperating portion of the cluster gear assembly.

Figure 1:
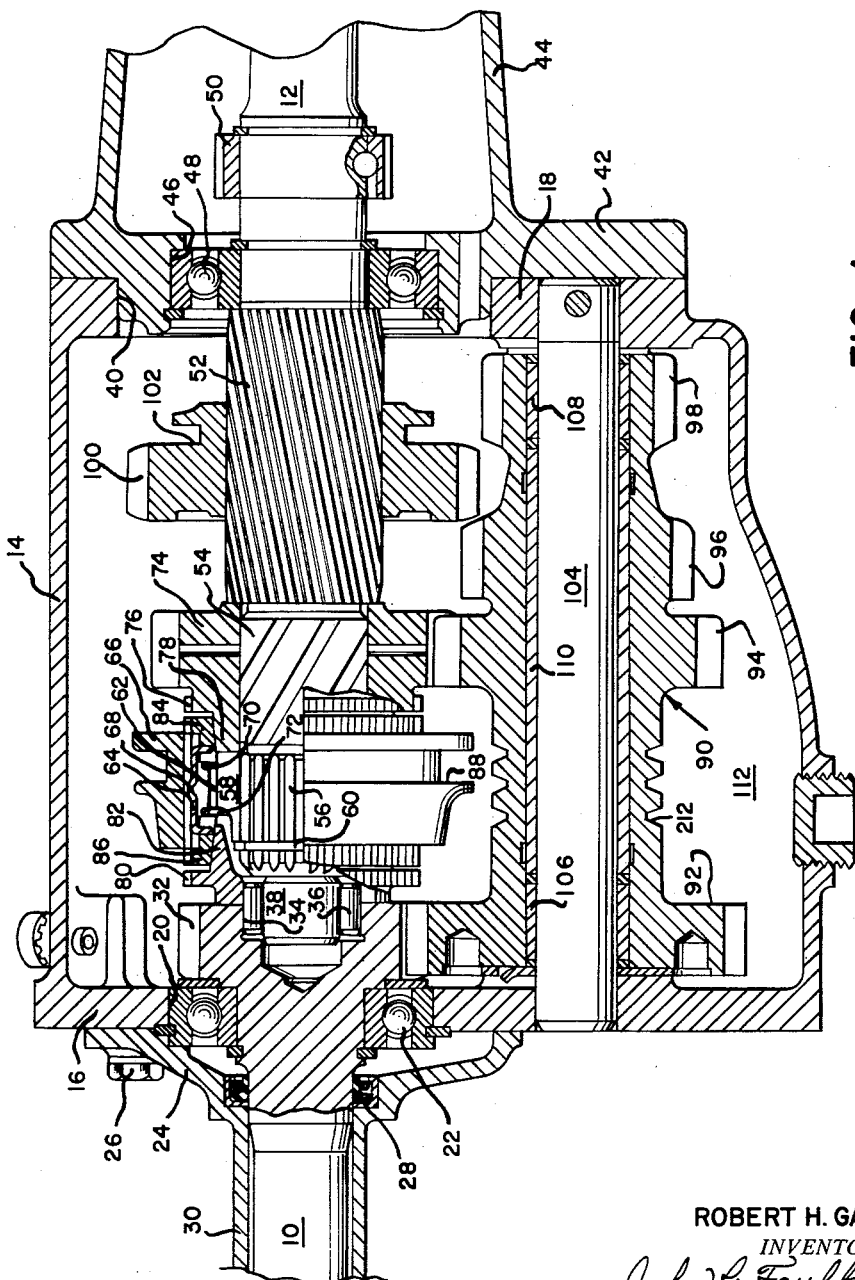
FIGURE 1 is a cross sectional assembly view of a multiple speed transmission assembly capable of incorporating the cluster gear braking feature above described.

Referring first to FIGURE 1, numeral 10 designates a power input shaft and numeral 12 designates a transmission main shaft or output shaft. Numeral 14 designates a main transmission casing and it is adapted to enclose the power delivery transmission gears. Casing 14 includes a front wall portion 16 and a rear wall portion 18. Wall portion 16 is formed with an opening 20 through which input shaft 10 extends. Shaft 10 is journaled in opening 20 by means of a suitable roller bearing assembly 22. A bearing cover and seal retainer 24 is secured to wall portion 16 by bolts 26 and it is adapted to retain a fluid seal 28 which encircles shaft 10 as indicated. Retainer 24 includes a fixed sleeve portion 30 capable of supporting a clutch release bearing and bearing hub for the transmission main clutch, not shown. The main clutch may include a clutch disc positively splined or otherwise secured to shaft 10 and a clutch pressure plate is also provided for applying a clutch energizing force to the clutch disc to effect a frictional driving connection between the clutch disc and the flywheel, the latter being driven by the vehicle engine crankshaft.

A power input gear 32 is positively connected to shaft 10 and it is formed with a central recess 34 capable of accommodating a pilot bearing 36, the latter journaling a pilot portion 38 of the aforementioned main shaft 12.

The rear wall portion 18 of casing 14 is formed with a pilot opening 40 for receiving a pilot shoulder on the forward portion 42 of a transmission extension housing 44. The portion 42 of housing 44 is in turn formed with a bearing opening 46 adapted to accommodate a ball bearing assembly 48. The shaft 12 is rotatably supported by bearing 48 as indicated.

Shaft 12 has secured thereto a speedometer drive gear 50 and it extends rearwardly to facilitate a driving connection with a drive shaft, a suitable universal joint usually being provided for this purpose.

An intermediate portion 52 of shaft 12 is formed with spiraled splines as indicated and an adjacent portion 54 is adapted to function as a gear bearing hub. Another portion 56 of shaft 12 is externally splined and it has received thereon an internally splined synchronizer clutch hub 58 which is retained on shaft portion 56 by a snap ring 60 situated in a cooperating snap ring groove. Hub 58 is formed with three spaced recesses, one of which is shown at 62 and one of three thrust bars or inserts 64 is situated in each recess 62. An intermediate and high synchronizer sleeve 66 is also slidably received over hub 58 and it is formed with internal splines which slidably cooperate with external splines formed about the periphery of hub 58. The intermediate portion of sleeve 66 is recessed for the purpose of receiving projections 68 on the inserts 64. The inserts 64 are in turn urged in a radially outward direction by insert springs 70 and 72 thereby biasing the inserts 64 into engagement with the inner periphery of sleeve 66.

An external intermediate gear is shown at 74 and is rotatably journaled on shaft portion 54. The hub of gear 74 is formed with synchronizer clutch teeth 76 and with an adjacent cone clutch element 78.

The power input gear 32 is formed with synchronizer clutch teeth 80 and with an adjacent cone clutch element 82 as indicated.

Blocker rings 84 and 86 are received over cone clutch elements 78 and 82 respectively and they are each formed with cone clutch surfaces which cooperate with the associated cone clutch surfaces of the aforesaid clutch elements 78 and 82. Inserts 64 are adapted to engage blocker rings 84 and 86 and to urge the same into clutching engagement with the respective cone clutch elements of the gears 74 and 32. Blocker rings 84 and 86 are each formed with angularly spaced recesses which receive the ends of inserts 64. The circumferential width of inserts 64 is somewhat smaller than the corresponding width of the associated recesses in the blocker rings, and a limited amount of lost motion between shaft 12 and sleeve 66 relative to the blocker rings is thereby made possible. Blocker rings 84 and 86 are each formed with blocker teeth situated in adjacent relationship relative to synchronizer clutch teeth 76 and 80 respectively.

The sleeve 66 is adapted to be shifted in either a forward or rearward direction by means of a conventional gear shifter fork which is under the control of the vehicle operator, the ends of which engage a peripheral groove 88 formed on the sleeve 66. When sleeve 66 is shifted in a rearward direction, the inserts 64 will exert a pressure on blocker ring 84 thereby causing clutching engagement of blocker ring 84 with cone clutch element 78 of gear 74. Such a shift occurs when the vehicle transmission is conditioned for intermediate speed operation as will subsequently become apparent from the statement of the operation. When the speed of hub 58 and sleeve 66 is synchronized with the speed of gear 74, sleeve 64 may be shifted past the blocker teeth for blocker ring 84 into engagement with synchronizer clutch teeth 76 thereby effecting a positive driving connection between shaft 12 and gear 74. In a similar fashion, when sleeve 66 is shifted in a forward direction, blocker ring 86 is brought into clutching engagement with the cone clutch element 82 of gear 32 until synchronism between gear 32 and shaft 12 is obtained. The sleeve 66 may pass over the external blocker teeth for blocker ring 86 and effect a clutching engagement between the internal clutch teeth of sleeve 66 and synchronizer clutch teeth 80. A direct drive connection is thereby established between power input shaft 10 and power output shaft 12.

A cluster gear assembly is generally designated by numeral 90 and it comprises spaced gear portions 92, 94, 96 and 98. Gear portion 92 is in continuous driving engagement with power input gear 32 and gear portion 94 is in continuous driving engagement with intermediate gear 74. Gear portion 96 is adapted to be engaged by a low and reverse sliding gear 100 which in turn is slidably splined on shaft portion 52. Gear 100 is formed with a peripheral groove 102 adapted to receive a second gear shifter fork which is under the control of the vehicle operator. When gear 100 is shifted in a forward direction, gear 100 drivably engages gear portion 96 of the cluster gear assembly 90 thereby establishing a geared connection between power input gear 32 and shaft 12. When the gear 100 is thus positioned and when sleeve 66 assumes a neutral position, the maximum torque multiplication ratio for the transmission is obtained.

When gear 100 is shifted in a rearward direction, it drivably engages a reverse idler pinion, not shown, and this pinion in turn is situated in continuous meshing engagement with respect to gear portion 98. When the gear 100 assumes this position and when sleeve 66 assumes a neutral position, the transmission is conditioned for reverse drive operation.

Cluster gear assembly 90 is preferably of unitary construction and it is rotatably journaled on a countershaft 104 situated in parallel relationship relative to shaft 12, suitable bushings 106 and 108 being provided for this purpose. A spacer sleeve 110 is positioned between bushings 106 and 108.

Countershaft 104 is end supported in front wall portion 16 and rear wall portion 18 of casing 14 as indicated. Casing 14 defines a lubricating oil sump region 112 and the cluster gear assembly 90 may be partially situated below the level of the lubricating oil in sump 112.

The above-described structure may be conditioned for forward drive operation with a high torque multiplication ratio by disengaging the transmission main clutch when the vehicle traction wheels are stationary and by shifting forward and reverse sliding gear 100 in a forward direction until it drivably engages gear portion 96 of cluster gear assembly 90. When the transmission main clutch is then mechanically engaged by the vehicle operator, a geared power delivery path is thereby completed between the engine crankshaft and tailshaft 12.

To condition the mechanism for intermediate speed operation, the transmission main clutch may be disengaged and sliding gear 100 may be moved to the position shown in FIGURE 1 thereby interrupting the power delivery path between shafts 10 and 12. While the clutch is still disengaged, synchronizer sleeve 66 may be manually urged in a forward direction so that inserts 64 will apply an axial pressure on the cone clutch surfaces of blocker ring 84 and clutch element 78. When synchronism is established, the internal clutch teeth on sleeve 66 may pass over the blocker teeth on blocker ring 84 until they drivably engage synchronizing clutch teeth 76 to establish a positive driving connection between main shaft 12 and intermediate gear 74. When the transmission main clutch is subsequently engaged, an intermediate driving speed is established.

To condition the transmission mechanism for direct drive operation, the transmission main clutch is again disengaged and synchronizer sleeve 66 is urged in a forward direction thereby causing inserts 64 to urge blocker ring 86 into clutching engagement with cone clutch element 82. When synchronism between shaft 12 and gear 32 is established, the sleeve 66 may be passed over the external blocker teeth on blocker ring 86 until clutching engagement between teeth 80 and clutch sleeve 66 is established. When the transmission main clutch is again engaged, a direct drive connection is established between the engine crankshaft and shaft 12.

It is apparent from the foregoing that whenever the transmission main clutch is engaged, the cluster gear assembly 90 is rotated about the axis of countershaft 104. When the vehicle is stationary prior to engagement of the gear 100 with gear portion 96 of cluster gear assembly 90, the transmission main clutch is disengaged and the inertia of the cluster gear assembly 90 is effective to cause cluster gear assembly 90 to spin about its axis. The total spin time is usually about three or four seconds in automotive type transmissions of known construction when the engine idling speed is normal. The vehicle operator must then delay a shift of the gear 100 into engagement with gear portion 96 until the speed of cluster gear assembly 90 is sufficiently reduced to permit a smooth engagement. The total spin time is increased if the clutch disc of the main transmission clutch is caused to drag on the flywheel plate or if the clutch pilot bearing has an undue degree of friction. Under such circumstances it is not unusual for the cluster gear assembly 90 to spin for approximately ten seconds or longer following disengagement of the main clutch.

In order to reduce the spin time above described, I have employed a friction brake mechanism which may be energized by means of the manually controlled linkage with which the synchronizer sleeve 66 is operated. This brake mechanism is particularly illustrated in FIGURES 2 through 6.

Figure 2:
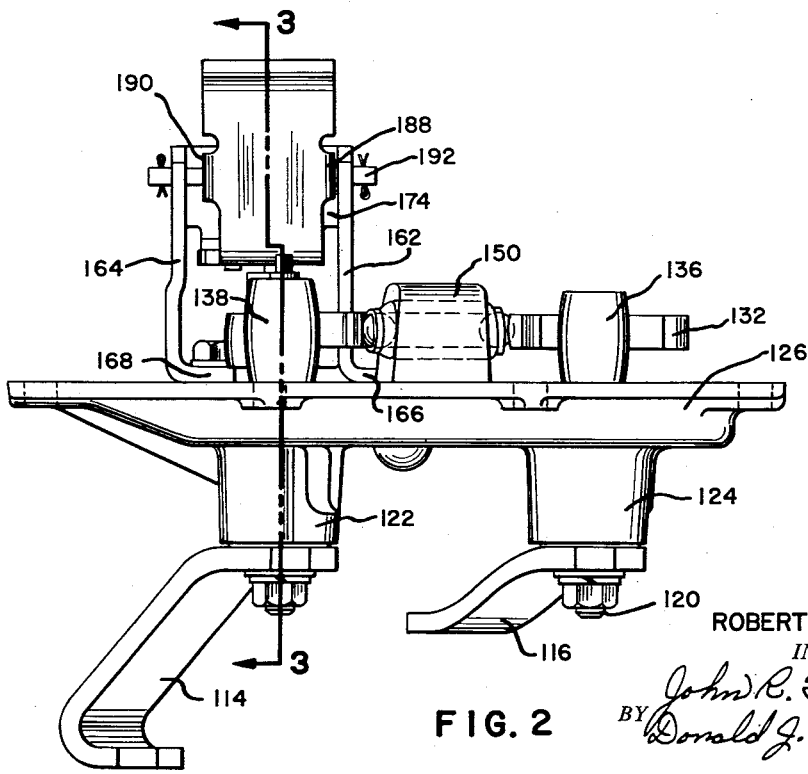
FIGURE 2 is a plan view of the friction brake and a portion of the brake operating mechanism.

A portion of the manually operated linkage mechanisms for actuating the synchronizer sleeve 66 and the gear 100 are shown in FIGURES 2 and 4 and they include externally mounted levers 114 and 116 which are carried by rotatably mounted shafts 118 and 120 respectively. Shafts 118 and 120 are journaled in supporting bosses 122 and 124 which are formed on the exterior side of a transmission cover plate 126. Cover plate 126 is received over an access opening in the side of the main transmission casing 14 and it is secured in place by a plurality of bolts 128 situated about the periphery of plate 126 and received through bolt openings 130. A suitable nut and lock washer is employed as illustrated for purposes of securing levers 114 and 116 to the ends of shafts 118 and 120 respectively. FIGURE 2 shows a rearward end view of the transmission assembly with the cover plate 126 secured in place.

FIGURE 5 shows the cover plate as viewed from the interior of the transmission. Shaft 120 has secured to the inner end thereof a cam element 132, and shaft 118 similarly has secured thereto a cam element 134. Cam elements 132 and 134 have formed thereon bosses 136 and 138, respectively, and they are each formed with openings which extend in a direction transverse to the axes of the shaft 12 and the countershaft 104. Each such opening is adapted to receive therein the stem of a shifter fork which extends to the region of the gear assembly with the arms thereof received in the grooves 102 and 88 of the gear 100 and the sleeve 66. When levers 114 or 116 are rotated, the cam elements 132 and 134 rotate in unison therewith so that the shifter forks for the gear 100 and sleeve 66 are moved in a generally longitudinal direction. In this fashion a shift from one transmission speed ratio to another may be accomplished.

Cam element 132 has formed thereon three detent recesses 140, 142 and 144 and they are each adapted to be engaged by a ball type detent element 146 which is spring urged into camming engagement with the adjacent edge of cam element 132. Detent element 146 is supported by a lock plunger 148 which in turn is slidably positioned in a boss 150 formed on the interior of cover plate 126.

In a similar fashion, cam element 134 is formed with three recesses 152, 154 and 156 and they are each adapted to be engaged by a ball type detent element 158 which is spring urged into camming engagement with the adjacent edge of cam element 134.

When the cam elements 132 and 134 assume the position shown in FIGURE 5, the transmission is conditioned for neutral. When cam element 132 is shifted in a clockwise direction, the shifter fork for the low and reverse gear 100 assumes a low speed position and the detent spring associated with detent element 146 yields to permit detent element 146 to engage recess 144 thereby establishing the low speed position for cam 132. When this occurs, lock plunger 148 is urged in a left-hand direction as viewed in FIGURE 5 thereby making it impossible for cam element 134 to be rotated in either a clockwise or a counterclockwise direction.

When cam element 132 is shifted in a counterclockwise direction, detent element 146 engages recess 140 to establish a reverse drive position for cam element 132. Lock plunger 148 will also be shifted in this instance in a left-hand direction to prevent movement of cam element 134.

When cam element 132 is again moved to a neutral position, cam element 134 may then be moved by the vehicle operator in either a clockwise or a counterclockwise direction so that detent element 158 will engage either recess 152 or 156. When cam element 132 is moved in this fashion in a counterclockwise direction, the shifter fork associated with synchronizer sleeve 66 is moved into clutching engagement with the intermediate speed gear 74 to establish an intermediate speed drive. When this occurs, lock plunger 148 is shifted in a right-hand direction thereby preventing an inadvertent shift of cam element 132 to the low speed or reverse positions.

When the cam element 134 is shifted in a clockwise direction, the spring for detent element 158 yields thereby causing detent element 158 to engage recess 152. Movement of the cam element in this direction causes the synchronizer clutch sleeve 66 to assume a direct drive connection with power input gear 32. Lock plunger 148 is again shifted in a right-hand direction as viewed in FIGURE 5 to prevent an inadvertent shift of cam element 132.

The countershaft brake mechanism is particularly shown in FIGURES 2 through 6 and it includes a bracket secured to the inner side of cover plate 126, this bracket being generally identified by numeral 160. Bracket 160 includes a pair of legs 162 and 164 and each of these legs is formed with a right angle portion as indicated by numerals 166 and 168 respectively. Bolts 170 and 172 are used for the purpose of securing bracket 160 to the cover plate 126.

Legs 162 and 164 are joined by a bridge 174 and a spring seat portion 176 is joined to bridge 174 in angular disposition therewith. The legs 162 and 164, the bridge 174 and spring seat portion 176 are preferably of unitary construction, and I contemplate that a suitable stamping and bending operation may be used in forming the same.

A brake member is generally shown by numeral 178 and it comprises a first portion 180 on which is situated friction material 182. Portion 180 is formed with a curvature substantially equal to the curvature of the portion of the cluster gear assembly 90 intermediate gear portions 92 and 94. Brake member 178 further includes a center portion 184 and a right angle portion 186. Bearing portions 188 and 190 are integrally formed on center portion 184 and a bearing shaft 192 is received through aligned openings in bearing portions 188 and 190 and in bracket legs 162 and 164. It is thus apparent that bearing member 178 will be pivotally mounted on bracket 160 for oscillation about the axis of shaft 192.

Right angle portion 186 of brake member 178 defines a cam element having a cam surface 194 and portion 186 situated on a plane approximately parallel to the axis of shaft 192.

Bridge 174 also has formed thereon an angular portion 196 which is adapted to carry a pivot pin 198. A cam element 200 is pivotally connected to pin 198 and it is formed with a cam surface 202 which is adapted to slidably coact with cam surface 194 when it is rotated about the axis of pin 198. Cam element 200 is pivotally connected to one end of actuator link 204 by means of a pin 206. The other end of ring 204 is connected to a radially outward part of cam element 134 as best seen in FIGURES 3 and 5.

Figure 3:
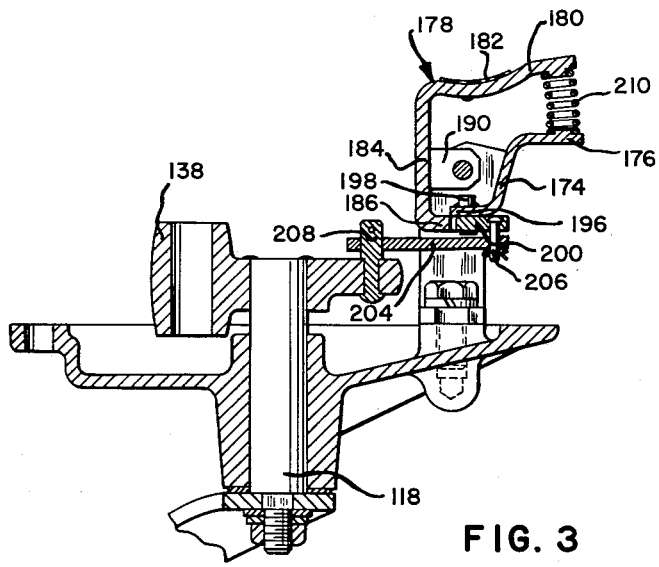
FIGURE 3 is a cross sectional view of the subassembly of FIGURE 2 taken along section line 3—3 of FIGURE 2.

A spring 210 is situated between spring seat 176 and portion 180 of brake member 178 for the purpose of normally biasing brake member 178 in a counterclockwise direction as viewed in FIGURE 3. Portion 186 of brake member 178 is thus normally urged in a counterclockwise direction only.

Referring next to FIGURE 6, I have illustrated the mode of cooperation between cluster gear assembly 90 and portion 180 of brake member 178. Cluster gear assembly 90 is formed with a plurality of tapered grooves 212 situated between gear portions 92 and 94. Friction material 182 is formed with cooperating projections which are adapted to be received in grooves 212 when the brake mechanism is applied.

It is apparent from the foregoing that when the brake assembly is secured to cover plate 126 the brake portion 180 will be situated in close relationship with respect to cluster gear assembly 90. Also, when cam element 134 is shifted by lever 114 in a clockwise direction as viewed in FIGURE 5 for the purpose of conditioning the transmission for direct drive high speed operation as previously described, cam element 200 will be rotated about the axis of pin 198 until cam surface 202 urges brake member 178 in a clockwise direction as viewed in FIGURE 3 by reason of the coaction between cam surfaces 202 and 194. Brake member 178 is thereby moved out of braking engagement with countershaft 90 to permit free rotation of countershaft 90. However, when cam element 134 is shifted to the neutral position illustrated in FIGURE 5, cam element 200 will be rotated so that cam surfaces 202 and 194 will permit counterclockwise rotation of brake member 178 under the influence of the pressure of spring 210. Friction material 182 will thereby engage the grooved portion of cluster gear assembly 90 to effect a cluster gear assembly braking action. Also, cam element 134 is shifted to an intermediate speed operating condition. As previously described, cam element 200 will cause brake member 178 to again move in a clockwise direction against the biasing effort of spring 210 thereby releasing the cluster gear assembly brake mechanism. Since cam element 134 must assume a neutral position prior to engagement of the gear 100 with the gear portion 96 for the purpose of establishing low speed operation, the cluster gear brake assembly will be subjected to a braking action which will substantially reduce or eliminate rotation of the cluster gear assembly prior to a shifting movement of gear 100.

The direction of rotation of the cluster gear assembly is such that the tangential force acting on brake member 178 due to the coefficient of friction between friction material 182 and the cluster gear assembly will establish a turning moment which will tend to rotate brake member 178 into braking engagement thereby supplementing the friction braking effort of spring 210. The cluster gear assembly brake mechanism may therefore be referred to as a self-energizing brake and this in turn reduces the amount of manual effort which is required by the vehicle operator to actuate brake member 178. The brake applying effort is provided solely by spring 210 and the operator is required to exert a force through the gear operating leverage system only when the brake mechanism is to be released. This takes place whenever the transmission mechanism is conditioned for intermediate or high speed operation as previously described. In each instance the high point on cam surface 202 engages the low point on cam surface 194, and when this occurs the spring effort of spring 210 is sufficient to maintain cam element 200 in a semi-locked condition by reason of the interference established by the cooperating cam surfaces. This reduces the tendency of the synchronizer sleeve 66 to be inadvertently shifted toward the neutral position under the influence of spring 210.

Referring more particularly to FIGURE 5, the high point of cam surface 202 is shown on the right-hand side of the centerline extending between pins 206 and 208. The countershaft brake mechanism assumes an engaged condition when the cam element 200 is positioned as shown. However, when cam element 200 is rotated in a clockwise direction, as viewed in FIGURE 5, about the axis of pin 198, the high point of cam surface 202 will move to the low point of cam surface 194 on the left-hand side of the high point of cam surface 194. When in this position, the high point of cam surface 202 is situated on the left-hand side of a centerline extending between pins 206 and 208.

It is apparent from the foregoing that cam element 200 assumes an over-center position whenever the cluster gear assembly brake mechanism is de-energized. In order to release the countershaft brake mechanism, it is necessary to exert an increased manual effort to overcome the tension of spring 210 since the cam surfaces 202 and 194 must be moved beyond top-dead-center which necessitates a pivoting action of brake member 178 against the opposing force of spring 210.

Having thus described a preferred embodiment of my invention, what I claim and desire to secure by U.S. Letters Patent is:

1. In a power transmission mechanism including a plurality of power delivery gears, operator controlled means for selectively and drivably engaging one gear with another, a first of said gears being connected to a rotary portion of said mechanism, said rotary portion defining a friction surface, friction brake means for retarding the relative motion of said gears including a movable brake member engageable with said rotary portion, resilient means for normally urging said brake member into frictional engagement with said rotary portion, and operator controlled linkage means for urging said brake member against the force of said resilient means to disengage said brake member from said rotary portion.

2. In a power transmission mechanism including a plurality of power delivery gears, one of said gears being mounted for sliding movement into and out of engagement with another of said gears, operator controlled means for actuating said sliding gear, said other gear being connected to a rotary portion of said mechanism, said rotary portion defining a friction surface, a friction brake including a movable brake member engageable with said rotary portion, spring means for urging said brake member into frictional engagement with said rotary portion, and operator controlled linkage means for releasing said brake member against the opposing force of said spring means.

3. In a power transmission mechanism for transferring power from a power input shaft to a main shaft, a power input gear connected to said power input shaft, a sliding gear connected to said main shaft, a cluster gear assembly including a first gear portion engageable with said power input gear and a second gear portion engageable with said sliding gear, operator controlled means for moving said sliding gear in an axial direction relative to said main shaft into driving engagement with said second gear portion, brake means for retarding rotary motion of said cluster gear assembly prior to engagement of said sliding gear and said second gear portion including a movable friction brake member engageable with a portion of said cluster gear assembly, spring means for urging said brake member into engagement with said cluster gear assembly, and manually operated linkage means for releasing said brake member against the opposing force of said spring means.

4. In a power transmission mechanism for transferring power from a power input shaft to a main shaft, a power input gear connected to said power input shaft, a sliding gear connected to said main shaft, a cluster gear assembly including a first gear portion engageable with said power input gear and a second gear portion engageable with said sliding gear, operator controlled means for moving said sliding gear in an axial direction relative to said main shaft into driving engagement with said second gear portion, brake means for retarding rotary motion of said cluster gear assembly prior to engagement of said sliding gear and said second gear portion including a movable friction brake member engageable with a portion of said cluster gear assembly, spring means for urging said brake member into engagement with said cluster gear assembly, manually operated linkage means for releasing said brake member against the opposing force of said spring means, said linkage means comprising a rotary cam element, bracket means for mounting said cam element for rotation about a fixed axis, and a link element pivotally connected to said cam element at a location spaced from said fixed axis, said brake member including a portion engageable with said cam element and another portion adapted to be moved into a cluster gear assembly braking position when said cam element is rotated about said fixed axis.

5. In a power transmission mechanism for transferring power from a power input shaft to a main shaft, a power input gear connected to said power input shaft, a sliding gear connected to said main shaft, a cluster gear assembly including a first gear portion engageable with said power input gear and a second gear portion adapted to be engaged with said sliding gear, operator controlled means for moving said sliding gear in an axial direction relative to said main shaft into driving engagement with said second gear portion, brake means for retarding rotary motion of said cluster gear assembly prior to engagement of said sliding gear and said second gear portion including a movable friction brake member, spring means for urging said brake member into engagement with a portion of said cluster gear assembly, manually operated linkage means for releasing said brake member against the opposing force of said spring means, said linkage means comprising a rotary cam element, bracket means for mounting said cam element for rotation about a fixed axis, a link pivotally connected to said cam element at a location spaced from said fixed axis, said brake member including a portion engageable with said cam element, said brake member being moved into a cluster gear assembly braking position when said cam element is rotated about said fixed axis, and means for pivotally mounting said brake member for oscillation about a fixed axis, said spring means normally applying a turning moment to said brake member in one direction so that said portion of said brake member is in continuous camming engagement with said cam element, the latter moving said brake member in the opposite direction against the biasing effort of said spring means when said cam element is rotated.

6. In a multiple speed power transmission mechanism having power delivery gears for transferring torque from a power input shaft to a main shaft, a power input gear connected to said power input shaft, a sliding gear slidably carried by said main shaft, a cluster gear assembly mounted in said mechanism for rotation about an axis parallel to said main shaft, said cluster gear assembly including a first gear portion in continuous engagement with said power input gear and a second gear portion engageable with said sliding gear, manually controlled means for conditioning said gears for torque delivery including portions adapted to shift said sliding gear into and out of engagement with said second gear portion of said cluster gear assembly, brake means for retarding rotary motion of said cluster gear assembly prior to engagement of said sliding gear with said second gear portion, a circular friction brake surface formed on said cluster gear assembly, said brake means comprising a brake member carried by a fixed portion of said mechanism and adapted to move into and out of engagement with said friction brake surface, and linkage means interconnecting said brake member and said manually controlled means for actuating said brake means when said sliding gear is shifted, the shifting motion of said sliding gear being transmitted through said linkage means to said brake member.

7. In a multiple speed power transmission mechanism having power delivery gears for transferring torque from a power input shaft to a main shaft, a power input gear connected to said power input shaft, a sliding gear slidably carried by said main shaft, a cluster gear assembly mounted in said mechanism for rotation about an axis parallel to said main shaft, said cluster gear assembly including a first portion engageable with said power input gear and a second gear portion adapted to be engaged by said sliding gear, manually controlled means for conditioning said gears for torque delivery including portions adapted to shift said sliding gear into and out of engagement with said second gear portion of said cluster gear assembly, brake means for retarding rotary motion of said cluster gear assembly prior to engagement of said sliding gear with said second gear portion, linkage means interconnecting said brake means and said manually controlled means, said brake means including a movable brake member, means for mounting said brake member for oscillation about a fixed axis, spring means for biasing said brake member into braking engagement with said cluster gear assembly, said linkage means including a cam element mounted for rotation about a fixed axis and engageable with a portion of said brake member, and a member pivotally connected to said cam element and forming a part of said linkage means for rotating said cam element when said manually controlled means is actuated.

8. In a multiple speed power transmission mechanism having power delivery gears for transferring torque from a power input shaft to a main shaft with a plurality of forward driving speeds, a power input gear connected to said power input shaft, a sliding gear slidably carried by said main shaft, a cluster gear assembly mounted in said mechanism for rotation about an axis parallel to said main shaft, said cluster gear assembly including a first gear portion engageable with said power input gear and a second gear portion adapted to be engaged by said sliding gear, manually controlled means for conditioning said gears for torque delivery including portions adapted to shift said sliding gear into and out of engagement with said second gear portion of said cluster gear assembly to establish a low speed torque delivery path, brake means for retarding rotary motion of said cluster gear assembly prior to engagement of said sliding gear with said second gear portion, linkage means interconnecting said brake means and said manually controlled means, said brake means including a movable brake member, means for mounting said brake member for oscillation about a fixed axis, spring means for biasing said brake member into braking engagement with said cluster gear assembly, said linkage means including a cam element mounted for rotation about a fixed axis and engageable with a portion of said brake member, and a member pivotally connected to said cam element and forming a part of said linkage means for rotating said cam element when said manually controlled means is actuated, said cam element assuming a brake member releasing position when the transmission mechanism is conditioned by said manually controlled means for shifting the movement of said sliding gear and assuming a brake member applying position when the other power delivery gears are conditioned for torque delivery.

9. The combination as set forth in claim 8 wherein said portion of said brake member is formed with a cam locking part engageable with said cam element and adapted to interfere with rotary motion thereof when said cam element assumes a brake member releasing position.

10. The combination as set forth in claim 7 wherein said brake member has formed thereon a friction element engageable with a portion of said cluster gear assembly.

11. In a multiple speed power transmission mechanism having power delivery gears for transferring power from a power input shaft to a main shaft, a power input gear connected to said power input shaft, a sliding gear slidably carried by said main shaft, a cluster gear assembly mounted in said mechanism for rotation about an axis parallel to said main shaft, said cluster gear assembly including a first gear portion engageable with said power input gear and a second gear portion adapted to be engaged by said sliding gear, manually controlled means for shifting said sliding gear into and out of engagement with said second gear portion of said cluster gear assembly, brake means for retarding rotary motion of said cluster gear assembly prior to engagement of said sliding gear with said second gear portion, linkage means interconnecting said brake means and said manually controlled means, said brake means including a movable brake member, means for mounting said brake member for oscillation about a fixed axis, and spring means for biasing said brake member in one direction into braking engagement with said cluster gear assembly, said linkage means including a cam element mounted for rotation about a fixed axis and engageable with a portion of said brake member, a member pivotally connected to said cam element and forming a part of said linkage means for rotating said cam element when said manually controlled means is actuated, said brake member having formed thereon a friction element engageable with a portion of said cluster gear assembly, said portion of said cluster gear assembly and said friction element being formed with cooperating grooves and projections.

12. In a multiple speed power transmission mechanism having power delivery gears for transferring torque from a power input shaft to a main shaft, a power input gear connected to said power input shaft, a sliding gear slidably carried by said main shaft, a cluster gear assembly mounted in said mechanism for rotation about an axis parallel to said main shaft, said cluster gear assembly including a first gear portion engageable with said power input gear and a second gear portion adapted to be engaged by said sliding gear, manually controlled means for shifting said sliding gear into and out of engagement with said second gear portion of said cluster gear assembly, brake means for retarding rotary motion of said cluster gear assembly prior to engagement of said sliding gear with said second gear portion, linkage means interconnecting said brake means and said manually controlled means, said brake means including a movable brake member, means for mounting said brake member for oscillation about a fixed axis, and spring means for biasing said brake member in one direction into braking engagement with said cluster gear assembly, said linkage means including a cam element mounted for rotation about a fixed axis and engageable with a portion of said brake member, the operator controlled means including a member pivotally connected to said cam element for rotating the same when said manually controlled means is actuated, said brake member having formed thereon a friction element engageable with a portion of said cluster gear assembly, the latter being formed with peripheral grooves and said friction element being formed with cooperating projections engageable with said grooves when said brake member is moved into a braking position.

13. In a multiple speed power transmission mechanism having power delivery gears for transferring power from a power input shaft to a main shaft, a power input gear connected to said power input shaft, a sliding gear slidably carried by said main shaft, a cluster gear assembly mounted in said mechanism for rotation about an axis parallel to said main shaft, said cluster gear assembly including a first gear portion engageable with said power input gear and a second gear portion adapted to be engaged by said sliding gear, manually controlled means for shifting said sliding gear into and out of engagement with said second gear portion of said cluster gear assembly, brake means for retarding rotary motion of said cluster gear assembly prior to engagement of said sliding gear with said second gear portion, linkage means interconnecting said brake means and said manually controlled means, said brake means including a movable brake member, means for mounting said brake member for oscillation about a fixed axis, and spring means for biasing said brake member in one direction into braking engagement with said cluster gear assembly, said linkage means including a cam element mounted for rotation about a fixed axis and engageable with a portion of said brake member, said linkage means further including members pivotally connected to said cam element for rotating the same when said manually controlled means is actuated, said brake member having formed thereon a friction element engageable with a portion of said cluster gear assembly, said portion of said cluster gear assembly being formed with peripheral grooves and said friction element being formed with cooperating projections engageable with said grooves when said brake member is moved into a braking position, said grooves being formed with a tapered cross sectional shape and said projections being formed with a complementary tapered shape, the sides of said projections engaging the sides of said grooves when said brake means is energized.

14. The combination as set forth in claim 8 wherein said transmission mechanism further includes a reverse idler gear, and a third gear portion of said cluster gear assembly being engageable with said reverse idler gear, said sliding gear being selectively engageable with the second gear portion of said cluster gear assembly and said reverse idler gear and said brake means being adapted to retard rotary motion of said cluster gear assembly prior to engagement of said sliding gear with said reverse idler pinion.

References Cited in the file of this patent

UNITED STATES PATENTS

| | | |
|---|---|---|
| 1,880,066 | Barnes | Sept. 27, 1932 |
| 2,066,199 | Di Renzo | Dec. 29, 1936 |
| 2,131,199 | Tenney | Sept. 27, 1938 |
| 2,201,169 | Griswold | May 21, 1940 |
| 2,345,250 | Fishburn | Mar. 28, 1944 |
| 2,512,856 | Fisk | June 27, 1950 |
| 2,601,627 | Price | June 24, 1952 |
| 2,653,690 | Saracchi | Sept. 29, 1953 |
| 2,838,950 | Symon et al. | June 17, 1958 |
| 2,875,872 | Backus et al. | Mar. 3, 1959 |